United States Patent [19]

Hemsath et al.

[11] 4,050,912

[45] Sept. 27, 1977

[54] APPARATUS FOR COOLING HOT GASES

[75] Inventors: Klaus H. Hemsath; Arvind C. Thekdi, both of Sylvania, Ohio

[73] Assignee: Midland-Ross Corporation, Cleveland, Ohio

[21] Appl. No.: 687,816

[22] Filed: May 19, 1976

[51] Int. Cl.² ............................................. B01D 47/14
[52] U.S. Cl. ........................................ 55/223; 55/233; 55/241; 55/259; 55/267; 55/461; 261/17; 261/116; 261/DIG. 9
[58] Field of Search ............. 55/223, 233, 241, 257 R, 55/267, 461, 259; 261/17, 98, 116, DIG. 9

[56] References Cited

U.S. PATENT DOCUMENTS

| 211,417 | 1/1879 | Meyer | 55/223 |
|---|---|---|---|
| 990,009 | 4/1911 | Richards | 261/17 |
| 3,208,830 | 9/1965 | Knight et al. | 23/281 |
| 3,704,570 | 12/1972 | Gardenier | 55/223 |
| 3,763,634 | 10/1973 | Alliger | 55/223 |
| 3,835,796 | 9/1974 | Sanga | 261/DIG. 9 |
| 3,912,464 | 10/1975 | Ewan et al. | 261/116 |

Primary Examiner—Frank W. Lutter
Assistant Examiner—David L. Lacey
Attorney, Agent, or Firm—Frank J. Nawalanic

[57] ABSTRACT

There is provided an efficient, economical apparatus for cooling hot gases which includes three generally cylindrical, tubular members arranged in an upstanding U-shaped configuration. The hot gases are introduced downwardly into the first leg or member of the configuration where a plurality of water nozzles provide a water boundary circumscribing the interior of the first leg to prevent thermal fatigue thereof. A water nozzle in the first member acting as a jet pump entrains the hot gases and directs them into the transverse leg or member of the configuration for rapid, turbulent cooling therein. Packed beds are provided in the second upstanding leg or member of the configuration to permit scrubbing of the cooled gases prior to exit. Cooling the gases in such a manner permits the entire configuration to be constructed of steel plate without any special insulation.

4 Claims, 4 Drawing Figures

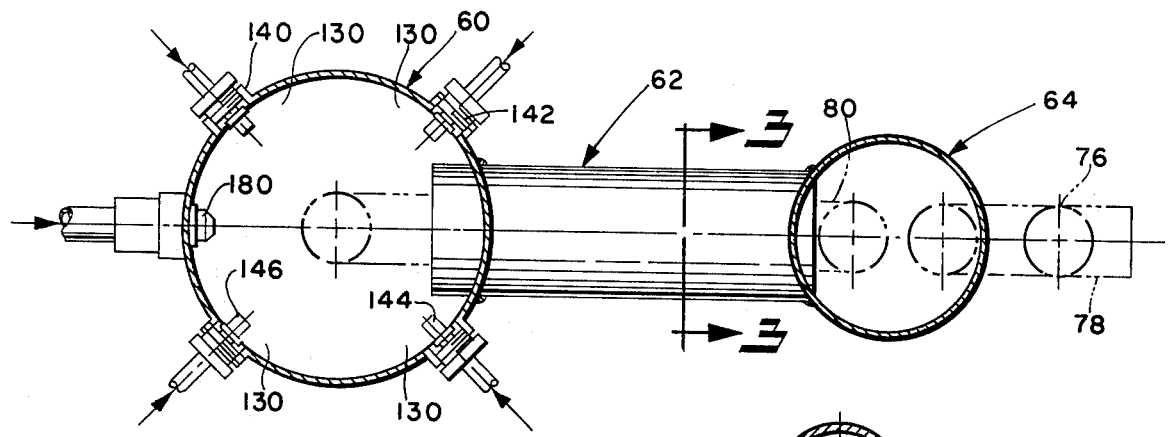
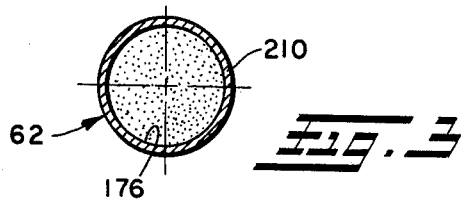
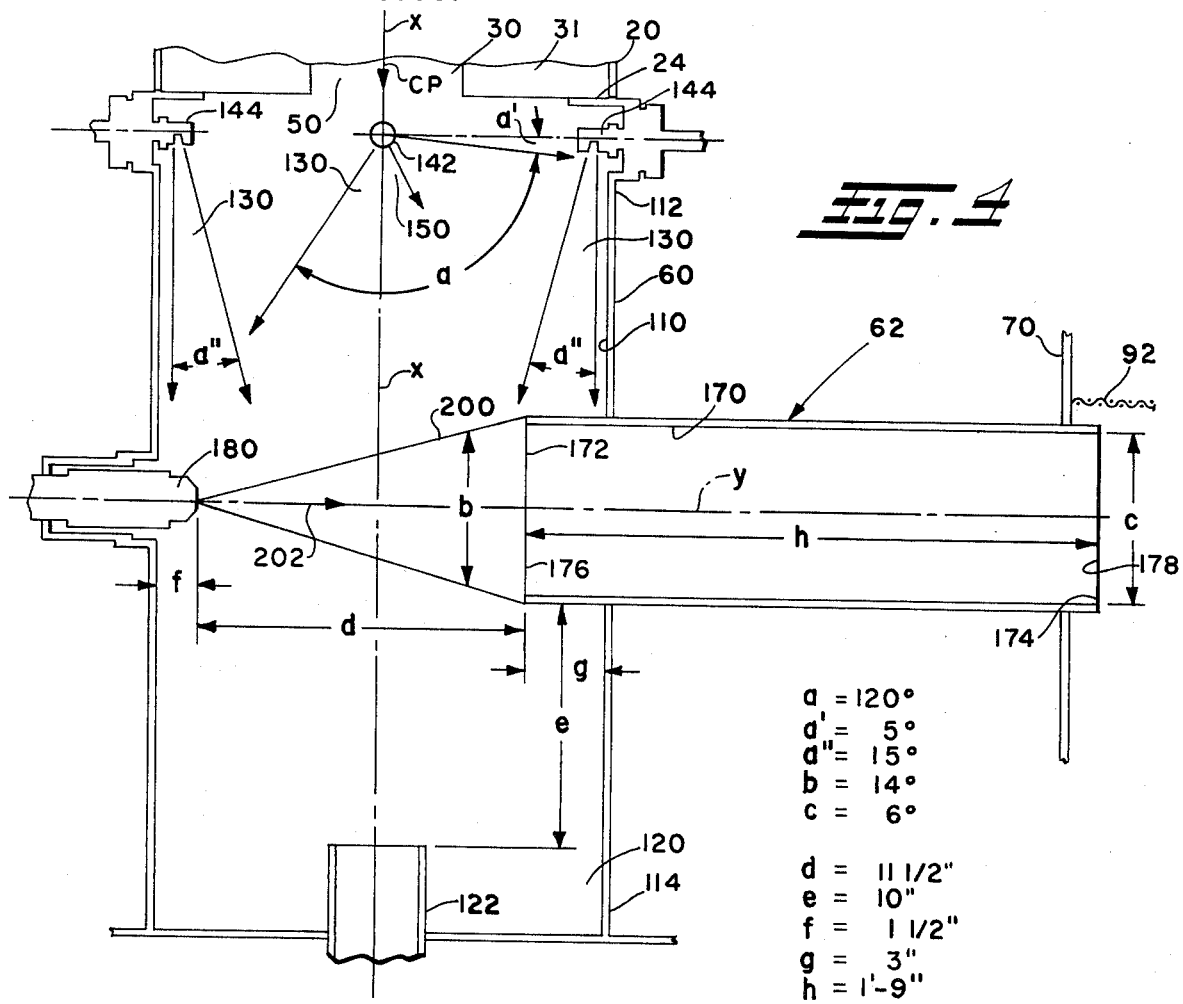

APPARATUS FOR COOLING HOT GASES

The present invention relates generally to cooling apparatus and, more particularly, to apparatus for cooling, quenching, scrubbing and the like hot gases produced in any type of thermal process.

The invention is particularly applicable in its use as an industrial gas generator for creating an atmosphere gas by cooling the products of combustion resulting from the burning of the hydrocarbon, such as methane and air, and will be described with particular reference thereto; however, it is appreciated that the invention has broader applications and may be used in other industrial furnace or process applications wherever a hot gas is given off by a process which is desired to be subsequently cooled and/or scrubbed or refined to produce a desired gas composition.

A gas generator of the type to which the present invention is particularly related to is shown in U.S. Pat. No. 3,208,830 assigned to the present assignee. The gas generator design shown is relatively expensive to produce when compared to the design disclosed herein by virtue of its size which is inherent in the design configuration disclosed therein. Further, the uninsulated lining of the gas generator in the '830 patent presented corrosion problems, partially attributed to the heat of the products of combustion, which required many advances in the art to rectify, such as water treatment, which are not necessary in the design disclosed herein. The most pertinent art relating generally to cooling known to the inventors is U.S. Pat. No. 2,664,402. While the '402 patent discloses a water spray for cooling, it utilizes insulated walls, an expensive water jacket and is not believed to possess the jet pump structure disclosed herein.

It is thus a principal object of the present invention to provide apparatus for cooling a hot gas which employs a structure that is small in size, convenient to manufacture and efficient in operation.

This object along with other features of the subject invention is achieved by generally U-shaped configuration having three cylindrical, steel plate, tubular members or conduits or chambers. The first tubular member extends generally vertical, has an upper open end defining its inlet and a closed lower end. Means are provided for injecting the hot gases downwardly into the first member through its inlet. Water boundary means, in the form of water spray nozzles spaced about the interior periphery of the first tubular member adjacent its inlet end, form a water boundary circumscribing the interior of the first tubular member to prevent "hot spots" from occurring therein. The second tubular member is positioned generally transverse the first tubular member and is of a predetermined length. The second tubular member has an inlet at one end which defines the outlet of the first member and an outlet at its opposing end. Jet pump cooling means in the form of a water spray nozzle positioned in the first tubular member directs a high speed, finely divided water spray into the second tubular member thereby entraining the hot gases in its spray and cooling the hot gases as the gases travel the length of the second tubular member in a turbulent fashion. The third tubular member extends generally vertically and transverse to the second member and has an inlet defined by the outlet of the second member and an outlet at its upper end. Within the third tubular member are means for scrubbing the cooled gases, taking the form of Raschig rings positioned between the inlet and the outlet of the third member.

Another object of the present invention is the provision of a hot gas cooling apparatus as described above which can be manufactured by assembling cylindrical elements to produce the desired water cooling chambers.

Still a further object of the present invention is the provision of gas cooling apparatus of the type described above which requires no external insulation while preventing heat or thermal fatigue of its various members.

Still a further object of the subject invention is to provide in a cooling apparatus of the U-shaped configuration described, means for rapidly cooling the hot gases by virtue of a finely divided, jet pump, water spray providing for entrainment of the gases and effective cooling of the gases as a result of the turbulent motion of the spray and gas in the transverse, tubular member.

These and other objects and advantages will become apparent from the following description taken together with the accompanying drawings, in which:

FIG. 2 is a cross-sectional view taken generally along line 2—2 of FIG. 1;

FIG. 3 is a cross-sectional view taken generally along line 3—3 of FIG. 2; and

FIG. 4 is an enlarged, partial side elevational view illustrating certain operating characteristics of the preferred embodiment of the present invention.

Figure 1:
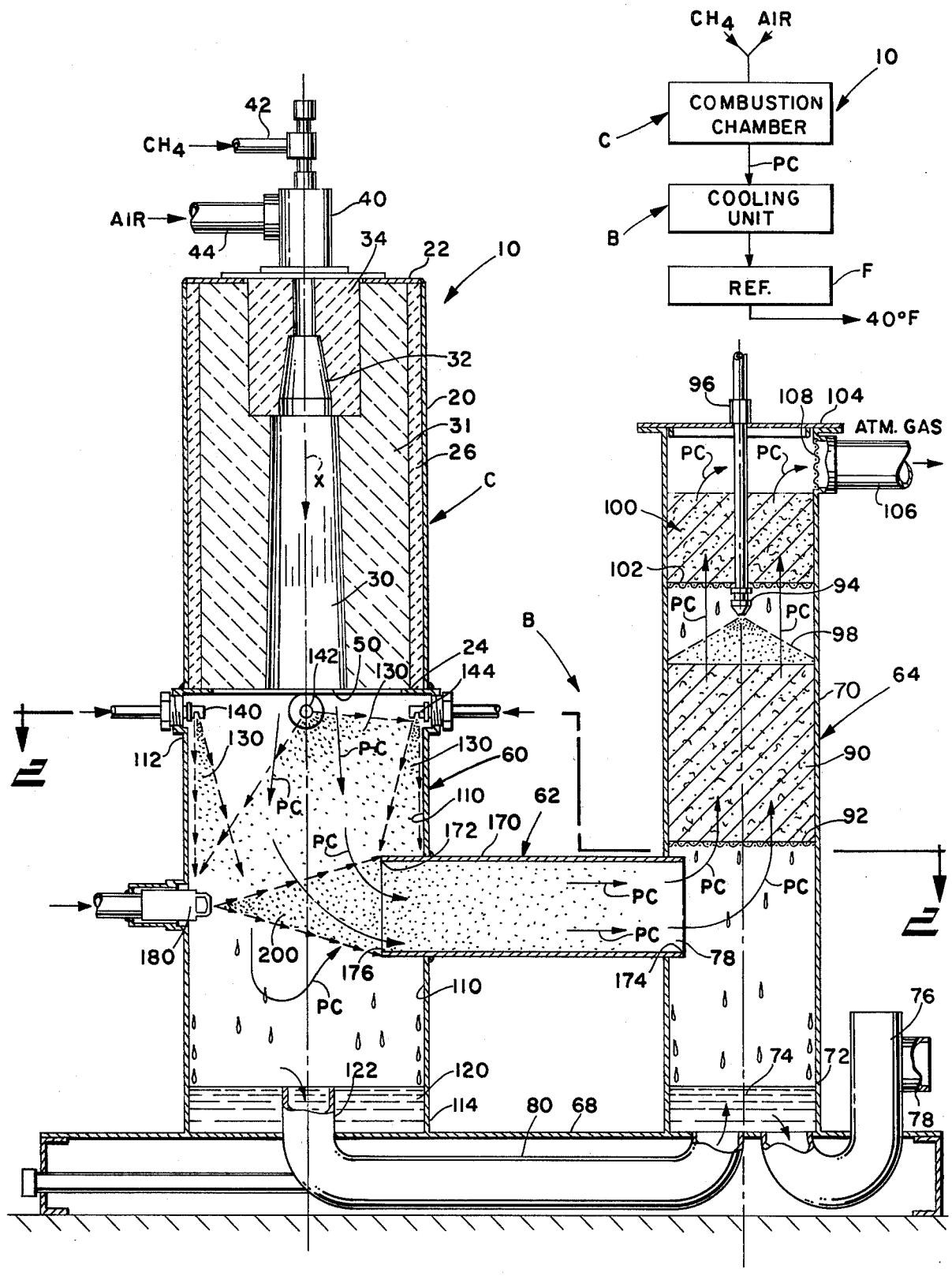
FIG. 1 is a side elevational view showing, somewaht schematically and in cross-section, the preferred embodiment of the present invention.

Referring now to the drawings wherein the showings are for the purpose of illustrating a preferred embodiment of the invention only, and not for the purpose of limiting same, FIG. 1 illustrates a gaseous atmosphere generator 10, shown schematically in the upper right-hand portion of this figure. This generator includes a combustion chamber C for burning a hydrocarbon, such as methane, and air. The products of combustion or hot gases PC are then passed through the cooling apparatus of the subject invention designated herein as cooling unit B which reduces the temperature of the products of combustion to generally ambient temperature.

A gas generator of the type contemplated by the present invention can have a capacity in the general range of 2500–30,000 cubic feet per hour. The illustrated embodiment of the invention is constructed with a capacity of approximately 6,000 cubic feet per hour. The representative dimensions of FIG. 4 are based upon this capacity. These dimensions can vary and will change according to the capacity of the gas generator.

Referring more specifically to the detailed showing of gas generator 10 in FIG. 1, the combustion chamber C is somewhat standard in construction. For illustrative purposes, chamber C has a cylindrical metal casing 20 with an upper closing plate 22 and a lower support plate 24. Standard insulation 26 is located around the inner surface of metal casing 20. An internal elongated combustion passage 30 is surrounded by a refractory material 31 which may be any of a variety of such materials. In practice, the refractory material 31 is Kaocast. One end of the combustion chamber 30 includes an ignition chamber 32 formed from a second refractory material unit 34. A mixing valve 40 accepts natural gas or methane at inlet 42 and air at inlet 44 for the purpose of formulating a desired combustible mixture of hydrocarbon and air. This mixture is then introduced into ignition chamber 32 where it is initially ignited, by means not illustrated. The combustion is then sustained within combustion chamber 30. An outlet 50 for the combustion chamber directs products of combustion PC downwardly along a central axis "x." As so far described, the combustion of the hydrocarbon and air mixture is somewhat standard in this type of atmospheric gas generator and the products of combustion may have an initial temperature in the neighborhood of 2500°-3000° F. It should be clear to those skilled in the art that where the cooling unit B is used to cool gases that may be exhausted from thermal processes, the combustion chamber C will be replaced with a cylindrically hollowed refractory block directing hot gases downwardly along central axis "x."

The present invention relates to an improvement in the device for cooling the products of combustion in a gas generator. In accordance with the illustrated embodiment, cooling unit B includes a first stage cooling member or chamber or tube 60 which is cylindrical and extends vertically along a first axis or plane "x", a cylindrical, horizontal secondary cooling member or chamber or tube 62 extending along a second axis or plane "y" and a final or outlet cooling member or tube or chamber 64 which is also cylindrical and also extends along an axis or plane. All of these cylindrical members are connected in a generally upstanding U-shaped configuration, as best illustrated in FIG. 1. It should be noted that the axis planes of all three members 60, 62 and 64 could be 90° or 180° from that shown, severally or collectively, but in each instance, all members 60, 62 and 64 would be at right angles to one another, and the term "U-shaped" as used herein covers all such variations. It is noted that by employing the present invention, only cylindrical casings are required, which casings are somewhat easy to obtain and require no on site fabrication as such. In the past, when conveying the hot products of combustion, it was often necessary to insulate the various pipes and tubes to reduce the thermal fatiguing and other processing difficulties. The present invention does not require insulation of any of the elements. By describing the operating characteristics of the present invention, it will become apparent why there is no necessity for providing complicated and expensive insulating material around the tubular sections forming the sections of cooling unit B.

As so far described, the products of combustion PC issue from combustion chamber C and then move through first stage cooling member 60, second stage cooling member 62 and then through final cooling member 64. The present invention relates primarily to the overall arrangement of this cooling unit B in combination with the water spray cooling arrangements in first and second members 60, 62. The third or final cooling member 64 is somewhat similar to the cooling unit shown in prior U.S. Pat. No. 3,208,830 and this arrangement will be described before explaining the inventive aspects used in the first two cooling stages.

Third cooling member 64 includes a vertically extending, cylindrical steel casing 70 and a lower sump 72. This sump provides a reservoir for a body of water 74 communicated to a standpipe 76 having an outlet 78. A liquid level equalizing conduit 80 connects sump 72 with the lower portion of first stage cooling member 60 in a manner to be explained later. After products of combustion PC have been cooled in second member 62, they pass into the final or outlet cooling section 64 and upwardly through a packed bed 90 which, in the embodiment disclosed, is formed from Raschig rings in accordance with standard practice. Packed bed 90 is supported on a lower support screen 92. An upper nozzle 94 is supplied with coolant, such as water, from an inlet pipe 96 and directs a generally conical liquid spray 98 against the upper portion of bed 90. In accordance with somewhat standard practice, liquid from spray 98 passes downwardly through packed bed 90 as the products of combustion PC are passed upwardly. This movement may be assisted by an exhaust fan or blower forming an exit draft. In practice, after reaching nozzle 94, the products of combustion PC have a temperature of approximately 6°-7° F. above the water temperature used in nozzle 94. At this instance, the products of combustion are cooled, but still have a substantial amount of water droplets. To remove this vapor, the products of combustion are passed upwardly through a second packed bed 100 which is similar to packed bed 90. This packed bed 100 is a demisting unit and is supported by an annular screen 102. (As used herein the term "scrubber" means any type of device which removes an element from the gas. In the embodiment shown, packed bed 100 would be viewed as a scrubber since it removes water droplets. When cooling unit B is applied to other thermal processes, other gas elements might be desired eliminated and other types of scrubbers used accordingly.) The upper end of casing 70 is closed by an appropriate cap 104 while the substantially dried products of combustion issue through outlet 106 by way of screeen 108. This atmospheric gaseous material has the desired characteristics for subsequent use in manufacturing processes of various types.

Referring now to first stage cooling member 60, first member 60 includes cylindrical inner wall 110 generally concentric with axis "x" corresponding to the axis of combustion passage 30. Thus, products of combustion PC issuing along path "x" pass downwardly in a concentric fashion with respect to cylindrical inner wall 110 of first stage cooling member 60. Inner wall 110 has an upper end 112 and a lower end 114 which defines a liquid sump 120 having standpipe 122 for controlling the level of liquid within the sump. Standpipe 122 is connected to liquid level equalizing conduit 80 so that the liquid level within the lower portions of members 60, 64 are substantially the same during normal operation. As the level increases within sump 120, liquid overflows standpipe 122 and attempts to raise the level in sump 72. This cannot be done above the level controlled by outlet 78.

In accordance with the present invention, a water layer or boundary is created adjacent the cylindrical inner wall 110 of member 60 so that water separates the products of combustion from inner wall 110. In practice, a plurality of separate water boundaries, barriers or layers 130 are provided around the circumference of inner wall 110. These water boundaries cover the total circumference of member 60 adjacent the upper end 112 to protect the inner wall from heat created by the hot products of combustion. Also, this water has a tendency to slightly reduce the temperature of the products of combustion issuing from outlet 50. Although the water layers or barriers 130 could be produced in a variety of ways, a plurality of nozzles are provided around the periphery of wall 110 at upper end 112. These nozzles 140, 142, 144, 146 pump a large volume of water at approximately 40 psi in a generally circumferential direction along cylindrical wall 110. In the embodiment disclosed, four nozzles are used with each nozzle pumping approximately 3.7 gallons of water per minute along inner wall 110. The residue from this high volume water flow is accumulated within sump 120. The boundaries provide a relatively stable water protection between inner wall 110 and the hot products of combustion PC.

As illustrated in FIG. 4, each of the nozzles 140, 142, 144 and 146 creates a water boundary or layer 130. In the illustrated embodiment, the boundary or layer produced by nozzle 142 is shown in the most detail. The boundary is in the form of a fan extending in a direction both axially and circumferentially of inner wall 110. As illustrated when viewing the flow pattern from the front of the nozzle, there is an included angle which is greater than about 90° and preferably about 120°. This flow pattern is shifted from the horizontal direction at an angle of $a'$ which, in practice, is approximately 5°. By using this angle, the boundary or layer 130 from one nozzle is directed toward an adjacent nozzle and the water progresses tangentially around inner wall 110 to an area just below the outlet of the adjacent nozzle. By providing this type of barrier or selected water pattern at the outlet of each liquid nozzle, the pattern of each layer 130 overlaps so that there is a complete curtain of liquid surrounding or completely circumscribing inner wall 110 from a position adjacent the nozzles 140, 142, 144 and 146. It is noted that these nozzles are closely adjacent to outlet 50 of the combustion chamber. Thus, the rapidly moving products of combustion PC will be received by a substantially water encircled cavity and this water or other cooling liquid will effectively isolate the products of combustion from inner wall 110. By providing this high volume of water flow, a layer of water moves downwardly in member 60 to sump 120. Of course, the products of combustion will cause a certain amount of steam to be created; however, not all the liquid will be converted into steam and the integrity of the liquid barrier is generally maintained during the operation of gas generator 10, at least in the upper portion of member 60. The pattern of water layer or barrier 130 has a center portion 150 shown in FIG. 4. This portion extends generally in a downward direction; however, it does extend in a combination direction including both an axial component and a circumferential component. In this manner, the liquid of layers or sprays 130 can encompass the total inner wall 110 adjacent the upper end 112.

Nozzles 140, 142, 144 and 146 can also include an arrangement for allowing the water boundaries, layers or barriers 130 to spread inwardly toward the center of member 60. This is illustrated as angle $a''$ in FIG. 4 which angle is generally less than 25° and preferably about 15°. Thus, there is some tendency for the liquid layer or boundary to expand outwardly toward the path of the products of combustion issuing from outlet 50.

It has been found that this first stage cooling member does provide a good receptacle for high temperature products of combustion issuing from combustion chamber C which channels the products of combustion into the jet stream of nozzle 180 which functions in a manner to be hereinafter described.

Second stage cooling member 62 includes a cylindrical metal member or tube having an inner wall 170 which is cylindrical in shape and has a central axis "$y$." This tube includes ends 172, 174. End 172 forms inlet 176 for the second stage cooling member which is the outlet of first stage cooling member 60. In a like manner, outlet 178 of member 62 forms the inlet of the final cooling unit or member 64.

As illustrated, a nozzle 180 in first member 60 directs atomized water of high volume at high velocity in a generally conical spray 200 into inlet 176 of member 62. Importantly, the velocity of the spray is such to cause the products of combustion in first member 60 to be aspirated into or entrained within water spray 200. By providing an atomizing nozzle, the liquid within the spray is divided into very fine water droplets which produce a large surface area for surface contact with the products of combustion. Further, the conical spray is generally aligned with axis "$y$" of second member 62 and importantly the pattern is such that the spray contacts inlet opening 176 of second member 62. This insures that "hot spots" will not occur on the inlet portion of second member 62 extending within first member 60 because spray 200 is "wiping" the inlet and, also, turbulent flow of the spray necessarily results throughout the length of second member 62. This turbulence promotes better mixing of the spray and products of combustion, than what would occur if the jet was free standing and thus reduces the length of second member 62.

It is essential to the proper operation of cooling unit B that the distance from nozzle 180 to the inlet opening 176 be sized in proper relation to the velocity of spray 200 if the spray is to be effective as a jet pump. Also important is the length of second member 62, the size of the water droplets and velocity of the spray to insure that sufficient heat exchange has occurred between spray 200 and the products of combustion within second member 62. In the gas generator described, nozzle 180 produces approximately 26 gallons of water per minute at 40 psi. Nozzle 180 utilizes intermediately sized water droplets and importantly develops at least 2 inches $H_2O$ suction differential pressure between inlet 176 and outlet 178 of second member 62. It is important to note that this flow rate and pressure can be obtained from municipal water lines supplying ordinary water to industrial plants. Other dimensions noted are shown in FIG. 4 for the preferred embodiment. It should be noted for the preferred embodiment that, if the products of combustion entering first member 60 were at 2500° F., they would be cooled to approximately 2000°–2200° F. in first member 60 and brought to the temperature of the water spray as they exited second member 62. This temperature would be approximately 100°–120° F. as the heat from the products of combustion would be given off to the spray. The products of combustion would then be reduced in temperature in third member 64 to a value 5°–10° F. above water tap temperature.

The invention has been described with reference to a preferred embodiment. Obviously, modifications and alterations in addition to those already mentioned will occur to others upon reading and understanding the specification. It is our intention to include all such modifications and alterations insofar as they come within the scope of the present invention.

There has thus been disclosed an efficient cooling arrangement which permits utilization of a U-shaped configuration to provide a substantial reduction in the cost and size of other cooling arrangements used in the prior art.

Having thus defined our invention, we claim:

1. Apparatus for scrubbing, quenching, cooling hot gases comprising:

a generally U-shaped configuration having first, second and third steel plate, tubular members;

said first tubular member extending generally in a first plane and having an open upper end and a closed lower end, said first tubular member adapted to receive said hot gases through said upper end; liquid boundary forming means spaced about the peripheral interior of said first tubular member for forming a liquid boundary circumscribing the interior of said first tubular member to prevent hot spots from occurring in said first tubular member;

said second tubular member positioned generally transverse to said first tubular member in a second plane and having an inlet end extending into said first member and defining the outlet of said first member and an outlet at its opposite end, jet pump cooling means in said first tubular member directing a high speed, finely divided liquid spray into said second tubular member for entraining and aspirating said hot gases in said spray and substantially cooling said hot gases as said gases travel the length of said second tubular member; and said third tubular member extending generally transverse to said second member, said third member having an outlet at its upper end, a closed lower end and an inlet defining said outlet of said second member, and means for scrubbing said cooled gases between its outlet and its inlet.

2. Apparatus of claim 1 wherein said jet pump cooling means includes a water nozzle positioned in said first member opposite said inlet end of said second member and developing a spray of predetermined mass and velocity, said spray having a central axis aligned with the axis of said second member and a conical pattern intersecting the exterior edge of said inlet end of said second member to produce turbulent flow throughout the length of said second member while preventing thermal fatigue of said second member.

3. Apparatus of claim 2 wherein said hot gases are initially at a temperature of at least 2500° F., and said liquid is water.

4. A cooling apparatus for reducing the temperature of products of combustion issuing from the combustion chamber of a gas atmosphere generator at at least 2500° F., said cooling apparatus comprising: a first tubular cooling member having a cylindrical inner wall, an inlet at one end thereof and an outlet, said first member adapted to receive through its inlet said products of combustion; means for creating a liquid layer on said inner wall; a second tubular member with an inlet defining said outlet of said first tubular member, an outlet and intersecting said wall generally radially of said cylindrical wall; means for spraying a single stream of high velocity water droplets diametrically across said first cooling member and axially into the inlet of said second tubular member for entraining and aspirating said products of combustion therein, said spray being generally conical and intersecting said inlet of said second tubular member to promote turbulent mixing and substantial cooling of said products of combustion from a temperature of about 2000° to 2200° F. at said inlet of said second tubular member to reduce the temperature of said products of combustion to a temperature of about 100° to 120° F. at said outlet of said second tubular member; a third tubular member intersecting said outlet of said second tubular member, said third tubular member having an outlet at one end thereof and an inlet defining said outlet of said second tubular member; and means in said third member for further reducing the temperature of said products of combustion.

* * * * *